United States Patent
Basler et al.

(10) Patent No.: US 7,029,546 B2
(45) Date of Patent: Apr. 18, 2006

(54) METHOD FOR MAKING A MULTIPLY ABSORBENT PAPER SHEET AND RESULTING PRODUCT

(75) Inventors: Michel Basler, Issenheim (FR); Pierre Laurent, Colmar (FR); Gilles Roussel, Durrenentzen (FR); Rémy Ruppel, Durrenentzen (FR)

(73) Assignee: Georgia-Pacific France, Kunheim (FR)

( * ) Notice: Subject to any disclaimer, the term of this patent is extended or adjusted under 35 U.S.C. 154(b) by 0 days.

(21) Appl. No.: 10/381,449

(22) PCT Filed: Sep. 27, 2001

(86) PCT No.: PCT/FR01/03000

§ 371 (c)(1),
(2), (4) Date: Sep. 9, 2003

(87) PCT Pub. No.: WO02/26481

PCT Pub. Date: Apr. 4, 2002

(65) Prior Publication Data

US 2004/0121124 A1    Jun. 24, 2004

(30) Foreign Application Priority Data

Sep. 27, 2000   (EP)   .................................. 00402673

(51) Int. Cl.
  *B31F 1/20*   (2006.01)
  *D21H 11/00*  (2006.01)
(52) U.S. Cl. ........................ 156/209; 156/290; 156/292; 162/109; 162/111

(58) Field of Classification Search ................ 428/153, 428/154, 166, 172; 162/109, 111, 117, 118; 156/196, 209, 290–292
See application file for complete search history.

(56) References Cited

U.S. PATENT DOCUMENTS 6,656,569 B1 *  12/2003  Roussel et al. ............. 428/154

OTHER PUBLICATIONS

WO 97/11228, Berger et al, Multilayered Web-Type Tissue Products With an Unembossed, Substantially Freely Mobile Inner Layer; The Production of the Tissue Product, and a Device for use in its Manufacture, Mar. 27, 1997.*
WO 00/40800, Roussel et al, Absorbent Paper Product Comprising Two Plies, Jul. 13, 2000.*

* cited by examiner

*Primary Examiner*—Donald J. Loney
(74) *Attorney, Agent, or Firm*—Quarles & Brady LLP

(57) ABSTRACT

The invention concerns a method for making a sheet of paper comprising at least two crimped cotton-wool-like cellulose plies (20, 40). It consists in: unwinding a first ply (20) in the form of a strip from a reel, embossing it on an embossing unit (10, 12) and forming protuberances at its surface, unwinding a second ply (40) in the form of a strip from a reel, guiding it downstream of the embossing unit (10, 12), superposing the two strips, with their protuberances facing inwards, and in applying a linking means (14, 16) so as to make the two strips integral with each other. Said method is characterised in that immediately upstream of said linking means (14, 16), a tension regulating means (18) is applied in the machine direction on one of the strips, such that the two strips have the same elastic deformation in the machine direction when the linking means is applied. The invention also concerns a product obtained by said method.

18 Claims, 1 Drawing Sheet

METHOD FOR MAKING A MULTIPLY ABSORBENT PAPER SHEET AND RESULTING PRODUCT

TECHNICAL FIELD

The present invention relates to the field of sanitary or domestic papers and, in particular, to the products consisting of two or more plies of creped cellulose wadding. Such products are used as a handkerchief, a table serviette, toilet paper or the like. The invention is aimed particularly at the manufacture of a paper sheet used as toilet paper.

BACKGROUND ART

Cellulose wadding, also designated as tissue paper, is a paper with a low gsm count, of which it is desirable, according to the intended uses, to have the qualities of softness, flexibility, strength and absorption, alone or in combination. Depending on the technique for manufacturing it, it may be of the creped type. For example, creping may be obtained at the time of drying of the sheet. The latter is applied, still moist, to a cylinder heated to a temperature sufficient for extracting the moisture from it. The sheet is detached by means of a doctor blade placed between the latter and the surface of the cylinder. This operation, suitably conducted, gives rise to the formation of corrugations arranged perpendicularly to the direction of travel of the sheet. The creping of the sheet is characterized by the number of crests counted in the running direction, reduced to a unit of length. These corrugations give the sheet some elasticity of which it would otherwise be virtually entirely devoid. The creped cellulose wadding thus possesses some elongation capacity.

This property makes it possible to emboss the sheet. The embossing operation involves deforming the sheet in the direction perpendicular to its plane, so as to increase its thickness. The sheet is embossed by driving it, for example, between a rigid-blanket cylinder, provided with spikes projecting on the surface, and a rubber-blanket cylinder. Other combinations are possible and known to a person skilled in the art. All such cylinders which perform this function will be designated hereafter by embossing group. Depending on the embossing intensity, a sheet of greater or lesser thickness is obtained, this thickness being measured between the two planes delimiting the sheet. Embossing also affects other physical parameters of the sheet, such as the tearing strength, which decreases by virtue of the break of connections between the fibers. Its elongation capacity likewise decreases by virtue of the plastic deformation undergone.

It is well known to combine two or more plies of cellulose wadding in order to form thicker, more absorbent or stronger sheets. They may be embossed beforehand in order further to improve the thickness and the absorption capacity or be given more bulk. To ensure the connection of the plies to one another, an adhesive film may be interposed between the surface portions which come into contact with one another when one ply is superposed on the other.

A mechanical connection may also be made by knurling. This operation involves rolling a knurling wheel, provided with a suitable relief, on the surface of a sheet consisting of the plies to be combined and in bearing contact on a rigid surface. The latter may be smooth or have a relief complementary to that of the knurling wheel. The knurling wheel is pressed down with sufficient force to generate a connection between the plies in the compressed zones. The knurling wheels and the rigid bearing surface, generally a steel cylinder, taken as a whole, will be designated hereafter by knurling group.

The applicant has produced products with two plies of creped cellulose wadding, of which one is embossed and the other not, It was found that, in some cases, transverse folds were formed, giving the sheet an unsatisfactory appearance.

The manufacturing method may be broken down into a plurality of steps, each of which is known per se. A first strip of creped cellulose wadding is unwound from a unwinder. It is guided through an embossing group, the pattern of which is composed, for example, of pin-shaped protuberances. A second strip is unwound from a reel. This may be a second reel independent of the first, but there may also be two strips wound on the same reel. In this case, a means is provided for separating the two strips.

The second strip is directed toward the first, downstream of the embossing group. They are superposed by being placed in such a way that the tops of the protuberances of the first are located within the assembly. Subsequently, or at the same time, a connecting means is applied, making the two strips integral with one another.

The connecting means may consist of a knurling group, when the plies are connected according to this technique, or else of a mating cylinder, when the plies are connected by the top of the protuberances of the first ply, generally by means of an adhesive film.

It was observed that the undesirable formation of the transverse folds or of blisters on one of the plies was linked to the presence of relatively wide zones where the plies are free of one another. This is particularly the case when the plies are connected by knurling along longitudinal lines arranged near the edges of the sheet after cutting to the format of use. This phenomenon is also observed when the plies are partially bonded adhesively. Adhesive bonding is referred to as partial when, for example, the number of the actual connection points is lower than the number of contact zones between the plies. This result is obtained, in particular, when the first ply is embossed with protuberances having different heights and when an adhesive film is applied only to the highest tops. More generally, this phenomenon is observed when the connected zones are spaced from one another.

One means for eliminating this disadvantage is to reduce the unconnected free spaces by increasing the density of the connected zones, that is to say their number per unit area. However, the rigidity of the sheet is increased correlatively. This then runs counter to the search for the flexibility which is appreciated by consumers.

SUMMARY OF THE INVENTION

The subject of the invention is a method making it possible to produce such a product free to transverse folds or corrugations.

The manufacturing method according to the invention is characterized in that, upstream of said connecting means, a tension-regulating means is applied to one of the two strips, in such a way that these have the same elastic deformation in the running direction when the connecting means is applied.

Elastic deformation is a deformation which disappears when the stresses are relaxed. It is considered that the plies have the same elastic deformation when elastic deformations of the two plies are sufficiently near to one another not to generate blisters after the formation of the "log" (roll having the diameter of the final product before cutting to length).

In particular, the tension-regulating means is applied to the unembossed second ply. The present invention arises from the observation of the physical characteristics of the product before and after transformation. In fact, embossing induces such a deformation of the product that, at the exit of the embosser, its characteristics of elasticity and of elongation are modified. In the process of combining the two plies of the prior art, of which one is embossed and the other not, the unembossed ply substantially preserved its elasticity and its elongation capacity at the time when the connecting means was applied. In fact, up to this step, it underwent only a moderate tensile stress and deformation within its elastic range. This is not true of the first ply which underwent plastic deformation as a result of the embossing. After the roll of toilet paper was formed and the stresses applied to the sheet disappeared, the unembossed ply thus tended to return to its initial length, whereas the embossed ply did not shrink as much.

The document WO 97/11228 is known, which describes the manufacture of a paper with three plies, of which one, the central ply, is not embossed, the assembly being connected by knurling. It is specified in the text that deflecting rollers are placed along the path of the paper strip, some of which rollers have a rocker in order to compensate the differential tensions generated as a result of the nonembossing of one and the embossing of the others. This solution is aimed simply at ensuring that the tensions of the paper strips before knurling are balanced. This avoids the appearance of folds at the time of the connection of the strips to one another. However, this solution, in which action is taken on the paper strips by braking, has a limited effect. Moreover, braking and therefore tensioning a paper strip which is already under tension allows somewhat low adjustment latitude. Even if the difference in tension is cancelled, this does not mean that the strips have the same elastic deformation. This solution does not prevent the formation of folds or of blisters after the paper strips have been cut when wide zones are not connected to one another and does not prevent the strips having substantially different elastic properties after embossing.

According to a preferred characteristic, the tension-regulating means is applied to the unembossed second ply.

According to a special characteristic, the regulating means consists of a pair of rollers, between which one of the strips of cellulose wadding is passed, the rollers being driven so as to modify the tension of said strip in the longitudinal direction.

According to another characteristic, with the strips of cellulose wadding having a gem count of between 15 and 40 g/m$^2$ and having between 40 and 80 creping lines per cm, the second strip is accelerated, immediately upstream of the connecting means, by the tension-regulating means to a speed higher by 0.5 to 3% than that of the two strips during their passage through the connecting means, preferably higher by 1.5 to 2.5%.

The subject of the invention is also a cellulose wadding product having a gsm count of approximately 20 to approximately 80 g/m$^2$, comprising at least two plies and forming a stratified structure, including one embossed ply of creped cellulose wadding, of 10 to 40 g/m$^2$, comprising relief patterns consisting at least partially of discrete protuberances oriented toward the inside of the structure, and one unembossed ply obtained according to the method of the present invention. This product is characterized in that the embossed ply has, over at least a portion of its surface, at least 30 protuberances per cm$^2$, of which the area at the top is lower than 1 mm$^2$, preferably lower than 0.7 mm$^2$, the two plies having different gsm counts and/or different fibrous compositions.

According to another characteristic, the gsm counts of the two plies differ by at least 5%, preferably by 5 to 30%. Advantageously, the gem count of the embossed ply is between 15 and 20 g/m$^2$ and that of the unembossed ply is between 21 and 25 g/m$^2$ or else the gsm count of embossed ply is between 21 and 25 g/m$^2$ and that of the unembossed ply is between 15 and 20 g/m$^2$.

According to another characteristic, the fibrous compositions differ in such a way that one of the plies has a tearing strength higher than the other. In particular, the embossed ply has, over at least 30% and preferably at least 50% of the total area, at least 30 protuberances per cm$^2$, and, more particularly, the number of protuberances is at least 50 per cm$^2$ and their area at the top is lower than or equal to 0.4 mm$^2$.

According to another characteristic, the product has a second pattern of embossing protuberances between said surface portions, and the plies are combined by means of the connection by adhesive bonding of the distal surfaces of at least some of the protuberances of the embossed ply to said unembossed ply.

According to another characteristic, the protuberances of the embossing pattern of the first strip are spaced from one another, uninvolved zones between the protuberances occupying an area greater than 2 cm$^2$.

BRIEF DESCRIPTION OF THE DRAWINGS

The invention will be understood more clearly from a reading of the following description of two embodiments, with reference to the accompanying drawings in which.

DETAILED DESCRIPTION

Figure 1:
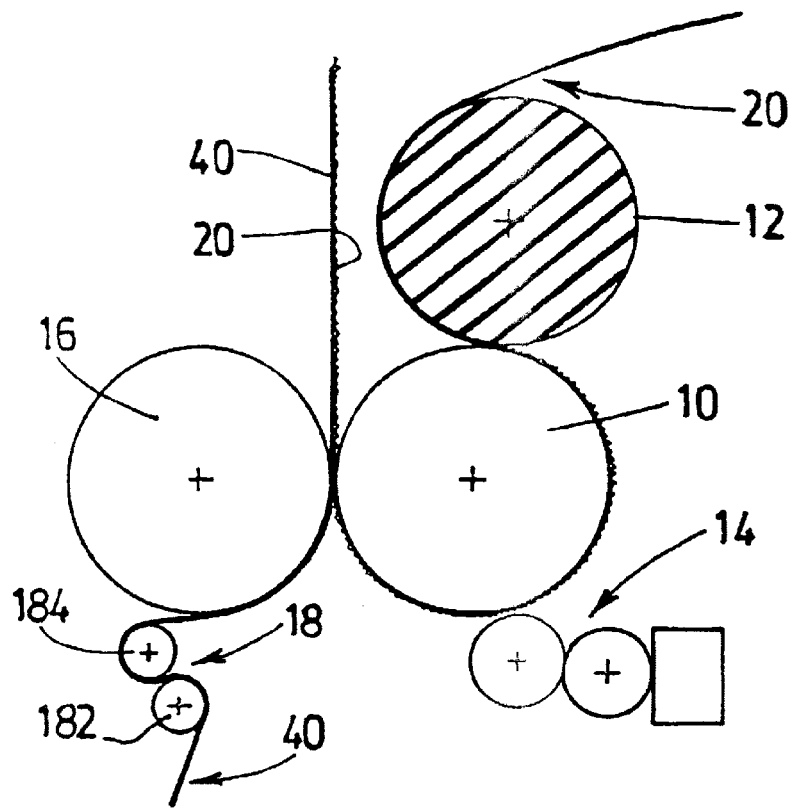
FIG. 1 illustrates an installation making it possible to emboss one ply and to combine it with another ply by adhesive bonding.

According to the first embodiment of the invention, the installation comprises in a known way an embossing group (10, 12), a glue applicator (14) and a mating cylinder (16). The embossing group comprises a steel cylinder (10) engraved according to a suitable pattern of protuberances. The protuberances, not illustrated, are, for example, of frustoconical or pyramidal shape, with a circular, oval or polygonal base. Other shapes known to a person skilled in the art are likewise suitable. The cylinder (12), having an axis parallel to that of the first cylinder, is made of rubber or of equivalent material. A ply of tissue paper (20) is unwound from a reel forming an unwinder, not illustrated, and is guided as far as the cylinder (12). The latter drives said ply and applies it to the surface of the engraved cylinder (10), over which it fits snugly with the relief. Downstream, the glue applicator device (14) deposits, by means of its applicator cylinder, an adhesive film onto the tops of the projecting surfaces of the engraving of the cylinder (10).

In parallel, a second ply (40) is driven and guided toward the first (20) and is applied against the glue-coated tops by a connecting means which is a mating cylinder (16). Downstream of the mating cylinder, the sheet composed of the two plies (20, 40) is driven toward a station for winding and for cutting, for example, into rolls of toilet paper. The cylinders are driven in synchronism by means of motors, not illustrated, as is known to a person skilled in the art.

As explained above, for the purpose of some applications, such as, for example, toilet paper, the area of the zones connected to one another is reduced as far as possible, to obtain a product which is as flexible as possible. The pattern of the protuberances is therefore selected accordingly. For example, the pattern may comprise first protuberances which are high and spaced from one another and which are combined with microprotuberances of large number, but of lower height. The glue is deposited by the applicator only onto the tops of the first protuberances. It is considered that the first protuberances are spaced apart if a disk with a diameter of 1.5 cm can be placed between adjacent protuberances. In this case, it was found that, by the technique of the prior art being implemented, the sheet had corrugations or blisters downstream of the mating cylinder and after cutting. To overcome this defect, according to one embodiment of the invention, a means for regulating the tension of the sheet (40) is provided immediately upstream of the connecting means (16). Said tension-regulating means is placed at a distance lower than three meters and preferably two meters from the nipping zone of the connecting means (16), depending on the installation. The aim is to prevent any disturbance on the paper strip. Nor can said tension-regulating means be placed too near, a distance of at least 50 cm must be left from the zone where the cylinders are in contact. This tension-regulating means (18) is composed of two parallel cylinders (182 and 184) having a small diameter in relation to that of the cylinders (10, 12, 16). For example, they have a diameter of between 10 and 20 cm. The sheet (40) is guided in succession around the two cylinders arranged in such a way as to impart a change of direction each time to the latter. These two cylinders have a nonslip blanket and are driven by means of a motor, not illustrated, at a defined speed. According to the invention, the tension regulator (18) slightly accelerates the ply (40) in relation to the speed of the two plies at the connecting means, so as to detension said ply before it is applied against the engraved cylinder (10) by the mating cylinder (16). This speed difference depends on the embossing intensity of the outer ply. The greater the plastic deformation undergone by the embossed ply will be, the more it will be necessary to increase the speed of the tension-regulating means in order to prevent the appearance of unaesthetic blisters. For levels of embossing corresponding to the product "Lotus Confort", registered trademark, currently on the French market, an increase of 1 to 2% of the speed in relation to the speed of travel of the sheet is suitable for obtaining a finished product free of any corrugation.

Tests were conducted in order to measure the impact of the embossing on the loss of elongation of plies of tissue paper. Embossing was carried out on two qualities of tissue paper (A and B) according to a pattern such as is used to produce a toilet paper sold under the trademark of Lotus Confort. This pattern comprises a ground pattern consisting of 80 protuberances per $cm^2$ and a main pattern, the protuberances of which are in the form of a stylized flower.

The paper was embossed on the same embossing machine for three pressure values corresponding respectively to the impressions with a width of 26, 28 and 30 mm. It is recorded that the embossing induces a reduction in the elongation capacity of approximately 40% to more than 50%.

| Identification | gsm count G/$m_g$ | Thickness Mm | Tearing strength in running direction MD N/m/ 1 ply | Tearing strength in transverse direction CD N/m/ 1 ply | Elongation in running direction % | Impression Mm |
|---|---|---|---|---|---|---|
| Tissue A | 20.4 | 0.16 | 109 | 47 | 21 | |
| Embossed | 18.2 | 0.24 | 86 | 30 | 12 | 26 |
| Em = 26 | −10.8% | 50% | −21% | −36% | −43% | |
| Embossed | 19 | 0.24 | 87 | 28 | 13 | 28 |
| Em = 28 | −6.9% | 50% | −20% | −40% | −38% | |
| Embossed | 18.5 | 0.26 | 71 | 23 | 10 | 30 |
| Em = 30 | −9.3% | 63% | −35% | −51% | −52% | |
| Tissue B | 22.5 | 0.18 | 144 | 50 | 28 | |
| Embossed | 21.2 | 0.27 | 131 | 37 | 17 | 26 |
| Em = 26 | −5.8% | 50% | −9% | −26% | −39% | |
| Embossed | 20.7 | 0.27 | 115 | 31 | 15 | 28 |
| Em = 28 | −8% | 50% | −20% | −38% | −46% | |
| Embossed | 20.9 | 0.29 | 110 | 29 | 14 | 30 |
| Em = 30 | −7.1% | 61% | −24% | −42% | −50% | |

Figure 2:
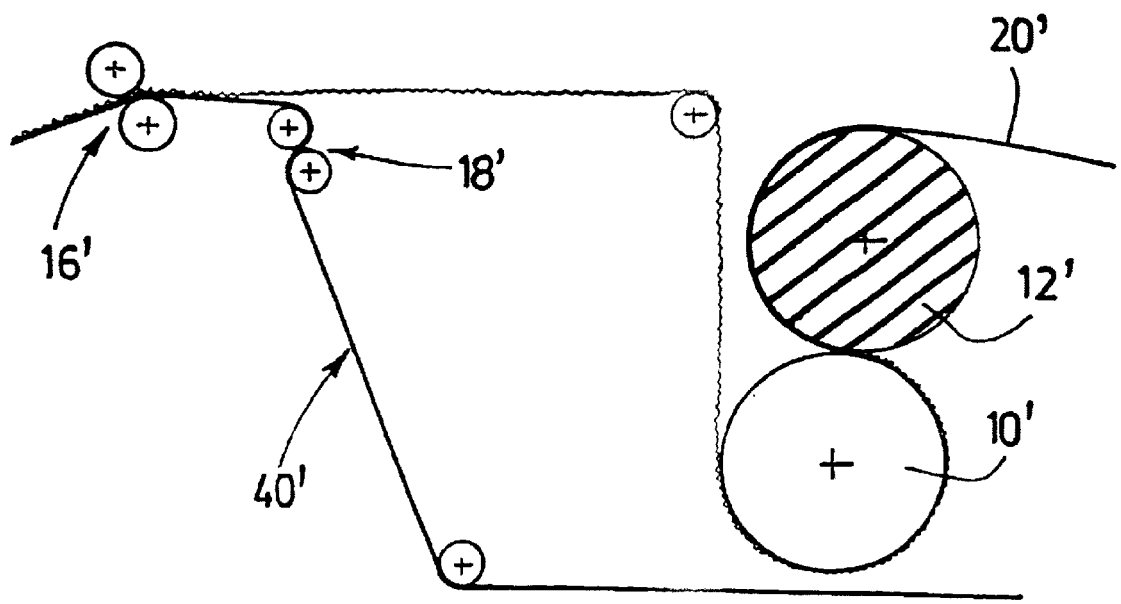
FIG. 2 illustrates an installation making it possible to emboss one ply and combine it with another ply by knurling.

FIG. 2 illustrates another embodiment where the plies are connected by knurling. One ply of creped tissue paper (20') is driven from an unwinder as far as an embossing unit (10', 12'). After embossing, the sheet (20') is guided toward a connecting means (16') which, in this case, is a knurling assembly known per se. A second ply (40') is driven from an unwinder directly as far as the knurling unit downstream of the embosser (10', 12'). According to the invention, a means for regulating the tension of the ply (40') is arranged upstream of the connecting means (16'). As in the preceding case, this regulator (18') is composed of two cylinders which accelerate the ply (40') before it is applied against the embossed ply (20') by the connecting means.

The invention claimed is:

1. A method for manufacture of a paper sheet comprising at least two plies of creped cellulose wadding, involving unwinding a first ply in a form of a strip from an unwinder, embossing it on an embossing group in order to form protuberances on its surface, unwinding a second ply in the form of a strip from an unwinder, guiding it downstream of the embossing group as an unembossed second ply, superposing the two strips, with protuberances toward an inside between the two strips, and applying a connecting means so as to make the two plies integral with one another, wherein immediately upstream of said connecting means, a tension-regulating means is applied to one of the two strips in the running direction, so that the two strips have a same elastic deformation in a running direction when the connecting means is applied; and wherein the tension-regulating means is applied to the unembossed second ply and accelerates said second ply in the running direction, so that the two strips have the same elastic deformation in the running direction when the connecting means is applied.

2. The method as claimed in claim 1, wherein said regulating means is at a distance lower than three meters and preferably at two meters from the connecting means.

3. The method as claimed in claim 1, wherein regulating means consists of a pair of rollers, between which one of the strips of cellulose wadding is passed, the rollers being driven so as to modify the tension of said strip in a longitudinal direction.

4. The method as claimed in claim 1, wherein the connecting means consist of a knurling group.

5. The method as claimed in claim 1, wherein the connecting means consists of a mating cylinder cooperating with a steel cylinder of said embossing group in order to make a connection between the strips at tops of the protuberances formed.

6. The method as claimed in claim 1, wherein an adhesive is applied to the tops of said protuberances before the connecting means is applied.

7. The method as claimed in claim 4, wherein the protuberances in an embossing pattern of the first strip are spaced from one another, uninvolved zones between the protuberances occupying an area greater than 2 cm$^2$.

8. The method as claimed in claim 7, the strips of cellulose wadding having a gsm count of between 10 and 40 g/cm$^2$ and having between 40 and 80 creping lines per cm$^2$, wherein the second strip is accelerated, immediately upstream of the connecting means, by the tension-regulating means to a speed higher by 0.5 to 3% than that of the two strips during their passage through the connecting means.

9. The method of claim 1, wherein the first ply is an embossed ply of creped cellulose wadding of 10 to 40 g/m$^2$, comprising relief patterns consisting at least partially of discrete protuberances oriented toward the inside of the two plies, and wherein the second ply is the unembossed ply, and wherein the embossed ply has, over at least a portion of its surface, at least 30 protuberances per cm$^2$, of which an area at a top is lower than 1 mm$^2$, preferably lower than 0.7 mm$^2$, the two plies having different gsm counts and/or different fibrous compositions.

10. The method as claimed in claim 9, wherein the gsm counts of the two plies differ by at least 5%, preferably by 5 to 30%.

11. The method as claimed in claim 10, wherein the gsm count of the embossed ply is between 15 and 20 g/m$^2$ and that of the unembossed ply is between 21 and 25 g/m$^2$.

12. The method as claimed in claim 10, wherein the gsm count of the embossed ply is between 21 and 25 g/m$^2$ and that of the unembossed ply is between 15 and 20 g/m$^2$.

13. The method as claimed in claim 9, wherein fibrous compositions of the two plies differ in such a way that one of the plies has a tearing strength higher than the other.

14. The method as claimed in claim 13, wherein the embossed ply has at least 30 protuberances per cm$^2$ over at least 30% and preferably at least 50% of the total area.

15. The method as claimed in claim 9, wherein a number of protuberances is at least 50 per cm$^2$, and their area at a top is lower than or equal to 0.4 mm$^2$.

16. The method as claimed in claim 9, wherein a second pattern of embossing protuberances is provided between surface portions of said two plies.

17. The method as claimed in claim 16, wherein the two plies are combined by means of a connection of distal surfaces of at least some of the protuberances of the embossed first ply to said unembossed second ply.

18. The method as claimed in claim 17, wherein the connection is obtained by an adhesive bonding of the protuberances of the second pattern at least partially.

\* \* \* \* \*